(12) United States Patent
Miyata (10) Patent No.: US 8,757,656 B2
(45) Date of Patent: Jun. 24, 2014

(54) AIRBAG, AIRBAG APPARATUS AND VEHICLE

(75) Inventor: Yasuhito Miyata, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/593,403

(22) Filed: Aug. 23, 2012

(65) Prior Publication Data

US 2013/0056966 A1  Mar. 7, 2013

(30) Foreign Application Priority Data

Sep. 1, 2011 (JP) .................................. 2011-190811

(51) Int. Cl.
*B60R 21/231* (2011.01)
*B60R 21/233* (2006.01)

(52) U.S. Cl.
CPC ..... *B60R 21/231* (2013.01); *B60R 2021/23324* (2013.01)
USPC ...... 280/729; 280/732; 280/743.1; 280/743.2

(58) Field of Classification Search
CPC ........... B60R 2021/23324; B60R 2021/23316; B60R 21/231; B60R 21/239
USPC ............................ 280/743.1, 743.2, 729, 732
See application file for complete search history.

(56) References Cited

U.S. PATENT DOCUMENTS

| 7,597,347 | B2 * | 10/2009 | Hasebe et al. | 280/729 |
|---|---|---|---|---|
| 2006/0131859 | A1 * | 6/2006 | Kumagai | 280/743.1 |
| 2010/0116186 | A1 * | 5/2010 | Kumagai | 112/475.08 |
| 2010/0156076 | A1 * | 6/2010 | Miyata | 280/743.1 |
| 2010/0156078 | A1 * | 6/2010 | Miyata | 280/743.2 |
| 2011/0025024 | A1 * | 2/2011 | Choi | 280/728.2 |
| 2012/0126515 | A1 * | 5/2012 | Miyata | 280/730.1 |
| 2013/0154246 | A1 * | 6/2013 | Matsui | 280/743.1 |

FOREIGN PATENT DOCUMENTS

| JP | 2006-103654 | 12/2006 |
|---|---|---|
| JP | 2010-274901 | 12/2010 |

* cited by examiner

*Primary Examiner* — James English
(74) *Attorney, Agent, or Firm* — Foley & Lardner LLP (57) ABSTRACT

An airbag includes: a base chamber; a left-half airbag inflated on a front-left side of the passenger, wherein a first opening is formed through the left-half airbag at an upper portion thereof; and a right-half airbag inflated on a front-right side of the passenger, wherein a first opening is formed through the right-half airbag at an upper portion thereof. A recess is formed between the left-half airbag and the right-half airbag so as to face the passenger, when the airbag is inflated in front of the passenger. The first openings are communicated with each other. A first seam joining the left-half airbag and the right-half airbag is formed to surround the first openings. The first openings communicated with each other are formed to extend in a vehicle front-rear direction.

7 Claims, 6 Drawing Sheets

AIRBAG, AIRBAG APPARATUS AND VEHICLE

This application claims priority from Japanese Patent Application No. 2011-190811, filed on Sep. 1, 2011, the entire contents of which are hereby incorporated by reference.

BACKGROUND

1. Technical Field

The present invention relates to an airbag and an airbag apparatus for restraining a driver or a passenger inside a vehicle when, for example, it collides with another object. More particularly, the invention relates to an airbag which has a left-half airbag and a right-half airbag and comes to have a recess that is continuous from the surface, opposed to the driver or passenger, of the airbag to its top surface when inflated, as well as an airbag apparatus which is equipped with such an airbag. The invention also relates to a vehicle which is equipped with such an airbag apparatus.

2. Related Art

JP-A-2006-103654 discloses an airbag for restraining a driver or a passenger inside a vehicle when, for example, the vehicle collides with another object in which a vertical recess is formed in its surface that is opposed to the driver or passenger when inflated. Paragraph 0039 of this document has a passage to the effect that when the vehicle collides with a front object, the shoulders of the driver or passenger are restrained by shoulder restraining portions, located on both sides of the recess, of the airbag as inflated and his or her head is restrained by the airbag as it goes into the recess.

In the airbag disclosed in JP-A-2006-103654, the left and right shoulder restraining portions communicate with each other through a communication hole that is as large as the vertical cross section of each shoulder restraining portion taken in the front-rear direction.

In this airbag, as shown in FIGS. 2-4 of the document, the recess extends continuously from its surface that is opposed to the driver or the passenger to its top surface. As shown in FIG. 15 of the document, the top surface of the airbag touches the windshield when it is inflated.

SUMMARY

According to one or more illustrative aspects of the present invention, there is provided an airbag which is inflated rearward from an instrument panel of a vehicle to come close a passenger seated in a passenger seat. The airbag includes: a base chamber which is disposed at a front side of the vehicle; a left-half airbag which is continuous with the base chamber and is inflated on a front-left side of the passenger, wherein a first opening is formed through the left-half airbag at an upper portion thereof; and a right-half airbag which is continuous with the base chamber and is inflated on a front-right side of the passenger, wherein a first opening is formed through the right-half airbag at an upper portion thereof. A recess is formed between the left-half airbag and the right-half airbag so as to face the passenger, when the airbag is inflated in front of the passenger. The first opening of the left-half airbag and the first opening of the right-half airbag are communicated with each other. A first seam joining the left-half airbag and the right-half airbag is formed to surround the first and second openings, and the first openings of the left-half airbag and the right-half airbag communicated with each other are formed to extend in a vehicle front-rear direction.

The present invention relates to an airbag which comes to have a recess that is continuous from its surface that is opposed to the driver or passenger to its top surface when inflated, whose top surface comes to touch the windshield when the airbag is inflated, and in which, in particular, produces a reaction force earlier at an initial stage of constraint of the driver or passenger by the airbag, an airbag apparatus which is equipped with such an airbag, and a vehicle which is equipped with such an airbag apparatus.

In the airbag according to the invention, upper portions of the left-half airbag and the right-half airbag communicate with each other through the openings and portions around the openings of the left-half airbag and the right-half airbag are sewed together. In a state that the airbag according to the invention is inflated, a recess is formed which is continuous from the surface that is opposed to the passenger to the top surface. When the vehicle collides with a front object, the head of the passenger is received by the airbag as it goes into that portion of the recess which is formed in the surface that is opposed to the passenger. The right-half airbag and the left-half airbag receive the right chest and the left chest of the passenger, respectively. The ribs which are hard and strong exist in each of the right chest and the left chest. The airbag receives the passenger using his or her ribs and thereby absorbs the kinetic energy of the passenger. The breastbone (located at the center of the chest of the passenger) and its neighborhood face the recess. Therefore, when the passenger body is received by the airbag, the breastbone and its neighborhood do not receive very strong reaction force from the airbag. That is, the force acting on the breastbone and its neighborhood is reduced.

When the airbag is inflated, peak portions on the left of and on the right of a valley portion, formed in the top surface, of the recess of the airbag come into contact with the windshield. When the airbag receives the passenger in this state, the airbag is pressed against the windshield and the valley portion approaches the windshield. In the invention, the valley portion is shallow because the openings are long and narrow and extend in the front-rear direction. Therefore, when the airbag receives the passenger, the bottom of the valley portion also comes into contact with or close to the windshield before the valley portion rises much. The gap between the windshield and the airbag disappears or is made very short and a wide contact area is formed between the windshield and the airbag. As a result, as soon as the airbag receives the passenger (this instant may be referred to as the start of restraint), the airbag is rendered less apt to move forward (toward the windshield) and hence the reaction force that the passenger receives from the airbag increases quickly.

If the vehicle which incorporates the airbag apparatus according to the invention collides with another object in a state that a passenger is seated in the passenger seat in such a manner that a larger part of his or her weight is supported by one side portion (e.g., left-side portion) of the passenger seat, the passenger is mainly received by the left-hand room of the airbag and the pressure of the left-hand room is made higher than that of its right-hand room. Part of the gas existing in an upper portion of the left-hand room flows into the right-hand room through the openings, whereby the force acting on the head of the passenger is reduced. The same advantage is obtained also in a case that a passenger is seated in the passenger seat in such a manner that a larger part of his or her weight is supported by a right-side portion of the passenger seat.

In the invention, the formation of the openings provides another advantage that upper portions of the left-half airbag and the right-half airbag are inflated and developed equally, whereby the internal pressure of the left-half airbag is made equal to that of the right-half airbag.

Where the second openings are formed through which lower portions of the left-half airbag and the right-half airbag communicate with each other and portions around the second openings are sewed together, the lower portions of the left-half airbag and the right-half airbag are also inflated and developed equally, which also contributes to the equalization of the internal pressure of the left-half airbag and that of the right-half airbag.

DETAILED DESCRIPTION

Exemplary embodiments of the present invention will be hereinafter described with reference to the drawings.

As shown in FIGS. 1-4, an airbag 10 has a right-half airbag 12 which is inflated on the front-right of a passenger, a left-half airbag 14 which is inflated on the front-left of the passenger, and a base chamber 16 which communicates with proximal portions of the right-half airbag 12 and the left-half airbag 14. Confronting walls of the right-half airbag 12 and the left-half airbag 14 are sewed together to form seams 91S and 92S.

The right-half airbag 12 and the left-half airbag 14 communicate with each other through first openings 91 and second openings 92 which are formed in their confronting walls. The first openings 91 and the second openings 92 are formed at an upper position and a lower position of the airbag 10 respectively. A preferable aperture area range of the first openings 91 is approximately 7,500 to 50,000 mm², and an even preferable range is approximately 20,000 to 40,000 mm². A preferable aperture area range of the second openings 92 is approximately 1,200 to 31,400 mm², and an even preferable range is approximately 1,900 to 20,000 mm². The openings 91 of the right-half airbag 12 and the left-half airbag 14 are placed on each other and portions around them are sewed together to form a seam 91S. The openings 92 of the right-half airbag 12 and the left-half airbag 14 are placed on each other and portions around them are sewed together to form a seam 92S. The seams 91S and 92S extend so as to surround the openings 91 and the openings 92, respectively.

Figure 6:
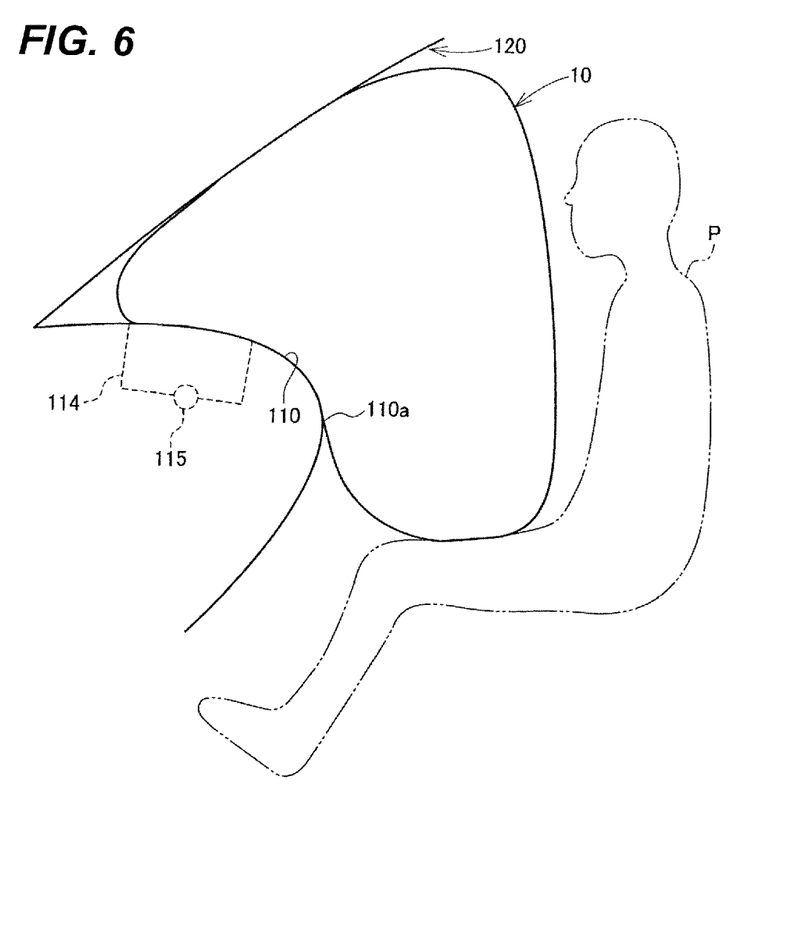
FIG. 6 is a side view of the airbag of FIG. 1 that is inflated.

The first openings 91 have a long and narrow shape and, as shown in FIG. 6 which is a side view as viewed from the direction that is perpendicular to the front-rear direction, the longitudinal direction of the first openings 91 is approximately parallel with a windshield 120 in a state that the top surface of the airbag 10 as inflated completely is in contact with the windshield 120.

Figure 3A:
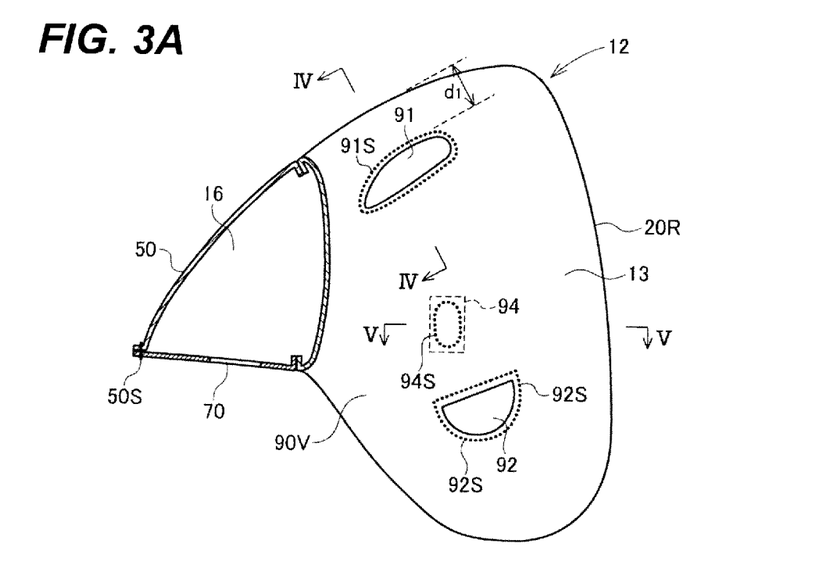
FIG. 3A is a sectional view taken along line III-III in FIG. 2
Figure 3B:
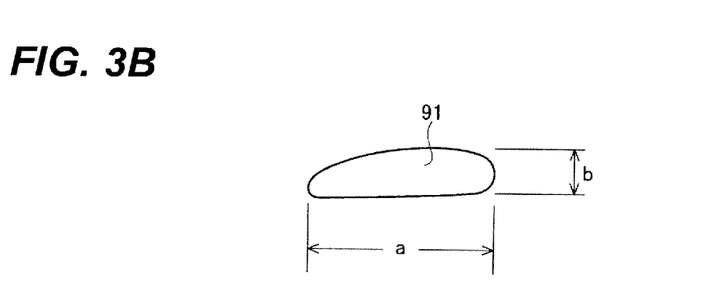
FIG. 3B is a side view of a first opening.

As shown in FIG. 3B, in an uninflated state, a preferable range of the ratio a/b of the longitudinal length a of the first openings 91 to their maximum width b in the direction perpendicular to the longitudinal direction is about 2.0 to 10.0 and an even preferable range is about 2.5 to 6.5. A preferable range of the length a is about 100 to 380 mm, and an even preferable range is about 120 to 280 mm. A preferable range of the length b is about 10 to 190 mm, and an even preferable range is about 20 to 110 mm.

In an inflation-completed state, it is preferable that the height of the area centers of the first openings 91 as measured from the bottom of the airbag 10 be about 350 to 830 mm. A preferable range of the height of the area centers of the second openings 92 as measured from the bottom of the airbag 10 is about 20 to 350 mm, and an even preferable range is about 55 to 200 mm. The term "area center" of an opening means the position of the center of gravity of a plate member having a uniform thickness and a uniform density when the opening is regarded as the plate member.

In an inflation-completed state, the surface, opposed to the passenger, of the airbag 10 and its top surface are formed with a continuous recess 13 between the right-half airbag 12 and the left-half airbag 14.

Figure 2:
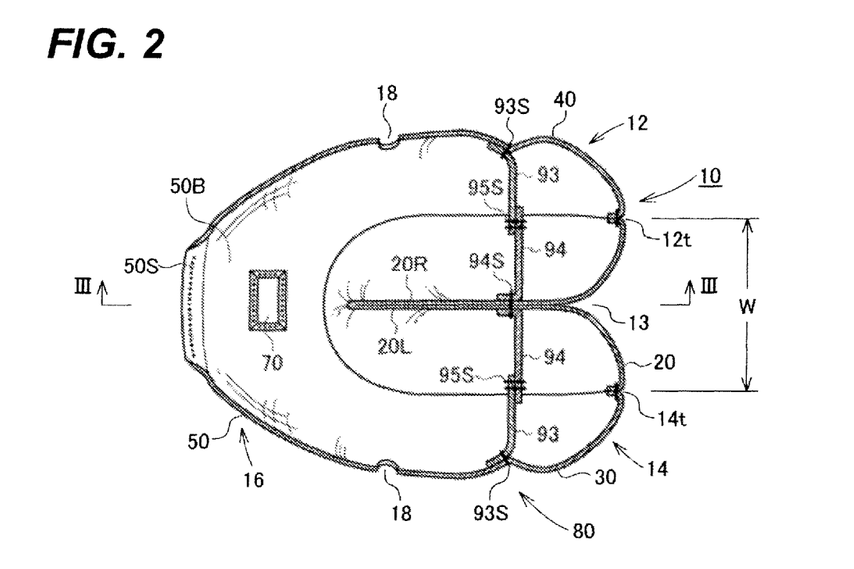
FIG. 2 is an approximately horizontal sectional view of the airbag of FIG. 1.

Referring to FIG. 2, it is preferable that in an inflation-completed state the interval W between a tip 12t, on the passenger side, of the right-half airbag 12 and a tip 14t, on the passenger side, of the left-half airbag 14 be 150 to 450 mm. It is even preferable that the interval be 170 to 430 mm.

Referring to FIG. 3A, it is preferable that in a state that the airbag 10 is inflated completely but is not in contact with the windshield 120, the instrument panel, the passenger, or the like, the minimum depth of that part (valley portion) of the recess 13 which is formed in the top surface of the airbag 10 as measured from the top surface of the airbag 10, that is, the shortest distance $d_1$ between the top surface of the airbag 10 and the seam 91S be 5 to 80 mm. It is even preferable that the shortest distance $d_1$ be 10 to 50 mm.

In the embodiment, as shown in FIG. 2, link bands 93 and 94 are formed in each of the right-half airbag 12 and the left-half airbag 14 at a position that is near the center of the right-half airbag 12 or the left-half airbag 14 in the top-bottom direction and the front-rear direction so as to extend in the left-right direction of the airbag 10. The link bands 93 and 94 restrict the left-right width of each of the right-half airbag 12 and the left-half airbag 14 when the airbag 10 is inflated, whereby the capacity of each of the right-half airbag 12 and the left-half airbag 14 is reduced and use of an inflater having a small output power is thereby enabled. Furthermore, since the link bands 93 and 94 restrict the interval W between the tip 12t of the right-half airbag 12 and the tip 14t of the left-half airbag 14, the ribs of the passenger is restrained by the right-half airbag 12 and the left-half airbag 14 and the load on his or her breastbone is thereby reduced.

Figure 4:
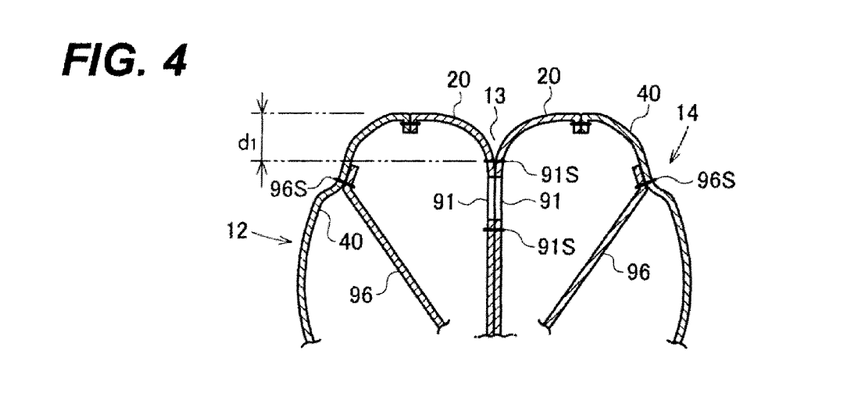
FIG. 4 is a sectional view taken along line IV-IV in FIG. 3A.

In the embodiment, as shown in FIG. 4, each link band 96 is formed so as to pull inward an upper portion of the outer side wall of the right-half airbag 12 or the left-half airbag 14 of the airbag 10 as inflated. This is to prevent interference between the airbag 10 as inflated and the A pillar. Reference symbol 96S denotes a seam that joins a link band 96 to the right-half airbag 12 or the left-half airbag 14.

A vent 18 is formed through the outer side wall of each of the right-half airbag 12 and the left-half airbag 14.

The panel configuration of the airbag 10 will be described below with reference to FIG. 5, which is an exploded perspective view in which the airbag 10 is disassembled into individual panels.

The outer shell of the airbag 10 is composed of an inside panel 20 and an outside panel 80.

The inside panel 20 is a long and narrow, generally gourd-shaped panel. As shown in FIG. 5, the inside panel 20 is folded at the center to form a right side portion 20R and a left side portion 20L. The right-side portion 20R serves as the inner side wall of the right-half airbag 12 and the left side portion 20L serves as the inner side wall of the left-half airbag 14. The overall perimeter of the inside panel 20 consists of a bottom sideline 28, a tip sideline 21, and a top sideline 22 of the left side portion 20L, a top side line 23 near the folding portion, a top sideline 24, a tip sideline 25, and a bottom sideline 26 of the right side portion 20R, and a bottom sideline 27 near the folding portion.

The outside panel 80 has a right outer wall 40 which serves as the outer side wall of the right-half airbag 12, a left outer wall 30 which serves as the outer side wall of the left-half airbag 14, and a mouth wall structure 50 which serves to form the base chamber 16.

The outer circumferential edge of the left outer wall 30 consists of a tip sideline 31, a top sideline 32, and a bottom sideline 34, and the outer circumferential edge of the right outer wall 40 consists of a tip sideline 41, a top sideline 42, and a bottom sideline 44.

The mouth wall structure 50 has a left side wall 50A, a bottom wall 50B, a right side wall 50C, a left flap 50D which serves as a top left side portion, and a right flap 50E which serves as a top right side portion. A proximal portion of the left outer wall 30 is continuous with the left side wall 50A, and a proximal portion of the right outer wall 40 is continuous with the right side wall 50C. Each of the side walls 50A and 50C is generally triangular, and the mouth wall structure 50 is open on the rear side.

The mouth wall structure 50 has, as outer edges, confronting sidelines 51 and 52 of the generally rectangular flaps 50D and 50E, rear sidelines (flap rear sidelines) 53 and 54 of the flaps 50D and 50E, front sidelines 55 and 56 of the flaps 50D and 50E, a front sideline 57 which is opposed to the front sidelines 55 and 56, and a rear sideline (bottom rear sideline) 60 of the bottom wall 50B.

The flap rear sidelines 53 and 54 are continuous with the top sidelines 32 and 42 of the left outer wall 30 and the right outer wall 40, respectively. The bottom sideline 60 is continuous with the bottom sidelines 34 and 44 of the left outer wall 30 and the right outer wall 40.

To allow the insides of the left-half airbag 14 and the right-half airbag 12 to communicate with each other, the first openings 91 are formed through the left side portion 20L and the right side portion 20R of the inside panel 20 at upper positions and the second openings 92 are formed through the left side portion 20L and the right side portion 20R of the inside panel 20 at lower positions.

As shown in FIG. 2, a seam 94S is formed at a position between the openings 91 and the openings 92 so as to join proximal end portions of the link bands 94 to the left side portion 20L and the right side portion 20R, respectively.

As shown in FIG. 2, a seam 93S is formed at such a position as to face the distal end of the associated link band 94 so as to join a proximal end portion of a link band 93 to the left outer wall 30 or the right outer wall 40 of the outside panel 80. Likewise, as partly shown in FIGS. 1 and 4, proximal end portions of the link bands 96 are sewed on the inside panel 20 and the outside panel 80.

Figure 5:
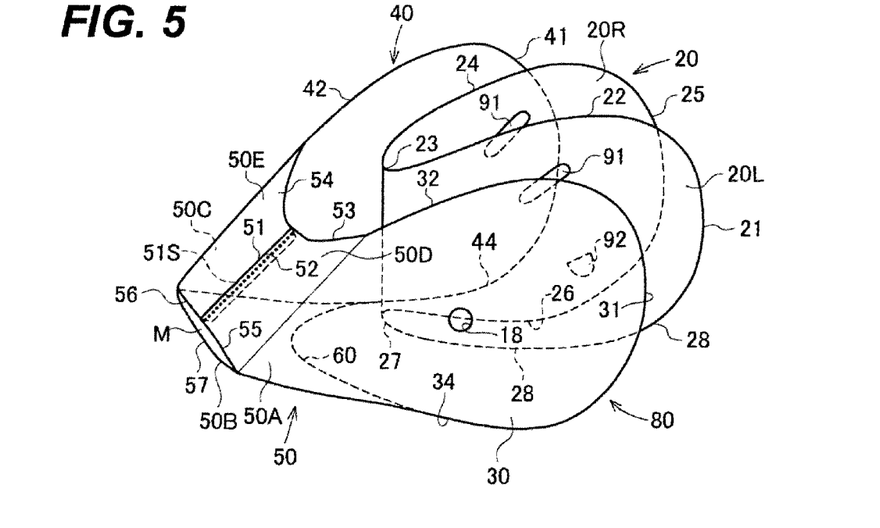
FIG. 5 is an exploded perspective view of the airbag of FIG. 1.

The link bands 93, 94, and 96 are not shown in FIG. 5 to clarify the panel configuration of the airbag 10.

As shown in FIGS. 2 and 3, a mouth 70 which is an opening for introduction of gas supplied from an inflater 115 (see FIG. 6) is formed through the bottom wall 50B of the outside panel 80 at the center in the left-right direction.

To manufacture the airbag 10, first, as shown in FIG. 5, portions, adjacent to the confronting sidelines 51 and 52, of the flaps 50D and 50E of the mouth wall structure 50 are sewed together to form a seam 51S.

Then, the inside panel 20 is folded into two parts so that its left side portion 20L and right side portion 20R are placed on each other, and the left side portion 20L and right side portion 20R are sewed together to form seams 91S and 92S around the openings 91 and the openings 92, respectively. Then, the left outer wall 30 of the outside panel 80 is opposed to the left side portion 20L of the inside panel 20. And portions adjacent to the tip sidelines 21 and 31 are sewed together, portions adjacent to the top sidelines 22 and 32 are sewed together, and portions adjacent to the bottom sidelines 28 and 34 are sewed together. Likewise, the right outer wall 40 of the outside panel 80 is opposed to the right side portion 20R of the inside panel 20, and portions adjacent to the tip sidelines 25 and 41 are sewed together, portions adjacent to the top sidelines 24 and 42, and portions adjacent to the bottom sidelines 26 and 44 are sewed together. Portions adjacent to the flap rear sidelines 53 and 54 of the mouth wall structure 50 of the outside panel 80 are sewed on a portion adjacent to the top sideline 23 of the inside panel 20, and a portion adjacent to the bottom rear sideline 60 of the mouth wall structure 50 is sewed on a portion adjacent to the bottom sideline 27 of the inside panel 20. Then, as shown in FIG. 2, distal end portions of each pair of link bands 93 and 94 are sewed together to form a seam 95S. Likewise, distal end portions of each pair of link bands 96 are sewed together.

The above-described sewing work produces an airbag in process that is inside out, that is, the sewing margins are exposed to the outside of the airbag in process. As shown in FIG. 5, in the mouth wall structure 50, in this state, portions adjacent to the flap front sidelines 55 and 56 have not been sewed on a portion adjacent to the front sideline 57 to leave an open mouth M.

Figure 1:
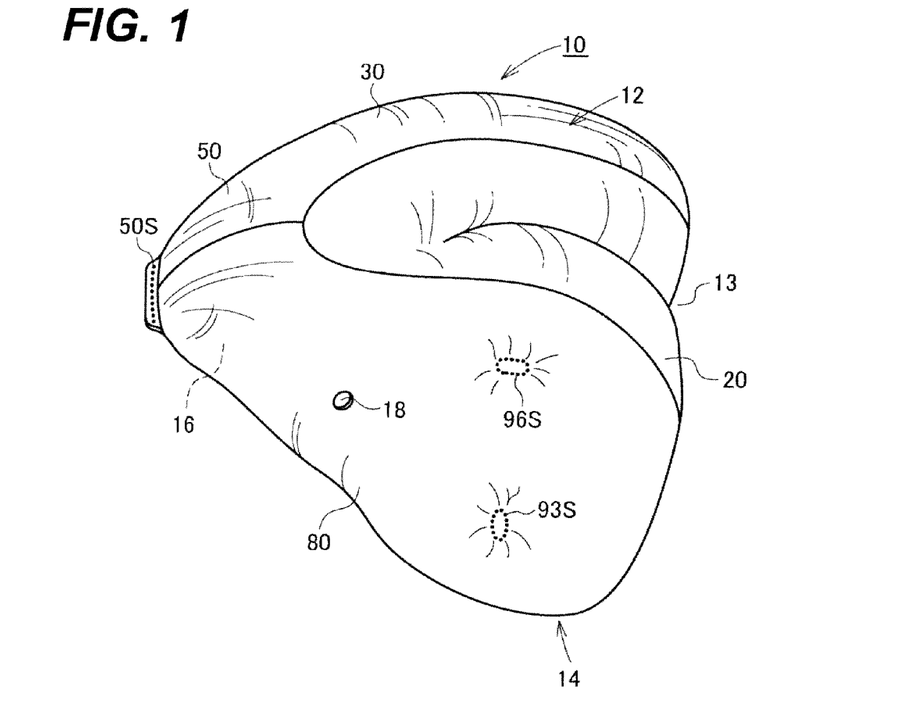
FIG. 1 is a perspective view of an airbag according to an embodiment.

Then, the airbag in process is reversed through the open mouth M and the open mouth M is closed by forming a seam 50S (see FIGS. 1 and 2). The airbag 10 shown in FIG. 1 is thus completed.

As shown in FIG. 2, the mouth 70 for introduction of gas supplied from the inflater 115 (see FIG. 6) is formed through the bottom wall 50B of the base chamber 16.

The airbag 10 can be sewed easily because its outer shell is composed of the two panels 20 and 80.

The airbag 10 is mounted in a passenger-side airbag apparatus to restrain a person seated in the passenger seat of a vehicle at the occurrence of a vehicle collision.

As shown in FIG. 6, the passenger-side airbag apparatus is equipped with a case (retainer) 114 which houses the airbag 10, the inflater 115 for inflating the airbag 10, etc. all of which are disposed in an instrument panel 110. The inflater 115 is disposed in the retainer 114. The airbag 10 which is folded up is housed in the retainer 114. The retainer 114 is provided with a lid so that the folded airbag 10 is covered with the lid. When the airbag 10 is inflated, the lid is cloven being pressed by the inflating airbag 10. In FIG. 6, reference numeral 120 denotes the windshield.

How the airbag apparatus operates will be described below.

When a vehicle that is mounted with the airbag apparatus collides with another object, the inflater 115 gushes out gas. The gas inflates the base chamber 16 and then flows into the right-half airbag 12 and the left-half airbag 14 to inflate them.

In the airbag 10, the base chamber 16 inflates first between the instrument panel 110 and the windshield 120 so as to keep its posture stable. As a result, the postures of the right-half airbag 12 and the left-half airbag 14 are also kept stable not only after completion of the inflation but also during the inflation.

Gas is supplied to the right-half airbag 12 and the left-half airbag 14 approximately equally from the base chamber 16 that has inflated. Furthermore, since tip-side portions of the right-half airbag 12 and the left-half airbag 14 communicate with each other through the first openings 91 and the second openings 92, the right-half airbag 12 and the left-half airbag 14 can inflate smoothly and approximately equally from an initial stage of the inflation. If the openings 91 and 92 were not formed, the internal pressures of the right-half airbag 12 and the left-half airbag 14 would become different from each other and hence they would inflate unequally and would possibly be developed unstably. The openings 91 and 92 prevent the right-half airbag 12 and the left-half airbag 14 from being developed unequally or behaving violently during inflation.

When the airbag 10 has been inflated completely, the recess 13 is formed at the center in the left-right direction so as to extend from the surface that is opposed to the passenger to the top surface. In the surface that is opposed to the passenger, a valley-shaped recess (part of the recess 13) is formed between the right-half airbag 12 and the left-half airbag 14 so as to extend in the vertical direction and to face the passenger.

If the passenger P is seated at the center of the passenger seat in the left-right direction, when the airbag 10 is inflated, the right-half airbag 12 and the left-half airbag 14 receive the right chest and the left chest of the passenger P, respectively, and the recess 13 faces his or her breastbone and its neighborhood. Therefore, the force acting on the breastbone and its neighborhood when the passenger P receives the airbag 10 is reduced. The head is received by the airbag 10 as it goes into the recess 13.

Figure 7A:
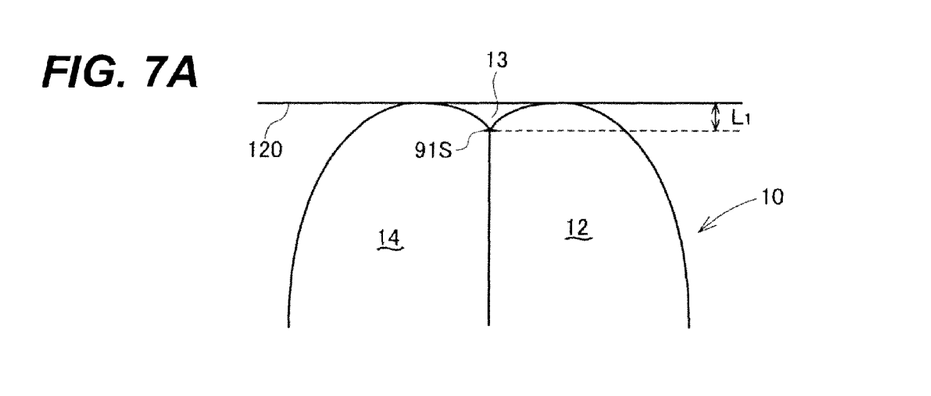
FIGS. 7A-7C illustrate the characteristics of the airbag of FIG. 1 through comparison with another airbag.

In the airbag 10, the depth $d_1$ (see FIG. 3A) of that portion (valley portion) of the recess 13 which is formed in the top surface over the first openings 91 is small. More specifically, since the first openings 91 extend approximately in the vehicle front-rear direction, when gas pressure acts so as to push up the valley portion of the recess 13 because of inflation of the airbag 10, the vertical width of the first openings 91 is increased to a large extent and the depth $d_1$ of the valley portion is made small. FIG. 7A schematically shows how the top surface of the airbag 10 touches the windshield 120.

Figure 7B:
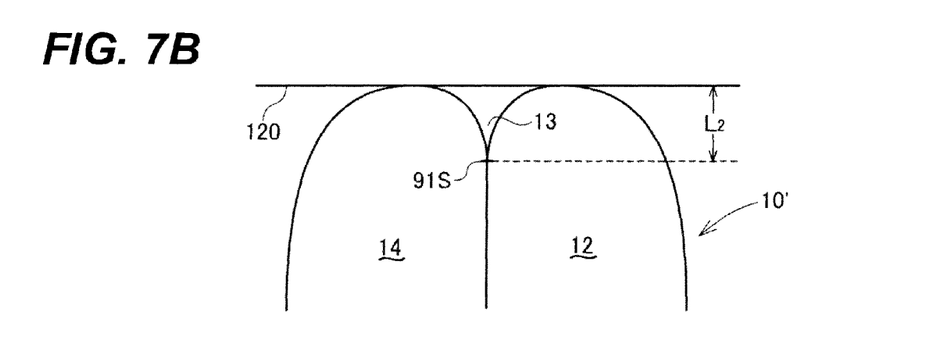

If an airbag 10' in which the opening area of the first openings 91 is the same as in the airbag 10 but its front-rear length is shorter than its vertical width were inflated in the same manner as the airbag 10, as shown in FIG. 7B a deep valley portion would be formed in the recess 13 because the upward expansive deformation of those portions of the inside panel 20 which are located in front of and behind the first openings 91 would be restricted when the airbag 10 is inflated.

Figure 7C:
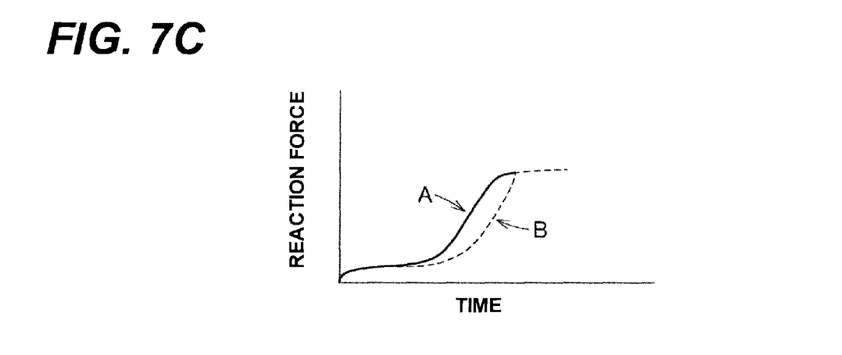

In the airbag 10 in which the recess 13 has a shallow valley portion (see FIG. 7A), when the airbag 10 which is receiving the passenger is pressed against the windshield 120, the bottom of the valley portion (i.e., the top portion of the seam 91S) immediately comes into contact with or close to the windshield 120 because the distance $L_1$ between the bottom of the valley portion and the windshield 120 is small. The contact area of the airbag 10 and the windshield 120 is increased and hence the forward movement of the surface that is opposed to the passenger is restricted. As a result, after the start of restraint of the passenger, the reaction force acting on the passenger rises earlier as indicated by line A in FIG. 7C.

In contrast, in the airbag 10' in which the recess 13 has a deep valley portion (see FIG. 7B), after the start of restraint of the passenger, the airbag 10' needs to move more than the airbag 10 (see FIG. 7A) until the bottom of the valley portion (i.e., the top portion of the seam 91S) comes into contact with or close to the windshield 120 because the distance $L_2$ between the bottom of the valley portion and the windshield 120 is large. Therefore, after the start of restraint of the passenger by the airbag 10', the reaction force rises later as indicated by line B in FIG. 7C.

In the airbag 10 according to the invention, the passenger restraining performance is improved because the reaction force at an initial stage of restraint of a passenger is increased.

In the embodiment, as shown in FIG. 3A, a vertically extending cavity 90V exists between the base chamber 16 and the seams 92S and 94S and between the right-half airbag 12 and the left-half airbag 14. The cavity 90V is formed so that at least part of its lower opening is located in the rear of a rearmost portion 110a of the instrument panel 110 (see FIG. 6) when the airbag 10 has been inflated completely. That is, when the airbag 10 has been inflated completely, at least part of the lower opening of the cavity 90V is exposed in the bottom surface of the airbag 10 in the rear of the rearmost portion 110a of the instrument panel 110. Therefore, even if a certain object exists in the vicinity of the instrument panel 110 when the airbag 10 is inflated, the object is inserted into the cavity 90V.

Although in the embodiment the right-half airbag 12 and the left-half airbag 14 are symmetrical with each other, they may be asymmetrical with each other. The right-half airbag 12 and the left-half airbag 14 may be either identical or different in capacity.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An airbag which is inflated rearward from an instrument panel of a vehicle to come close a passenger seated in a passenger seat, the airbag comprising:

a base chamber which is disposed at a front side of the vehicle;

a left-half airbag which is continuous with the base chamber and is inflated on a front-left side of the passenger, wherein a first opening is formed through the left-half airbag at an upper portion thereof; and a right-half airbag which is continuous with the base chamber and is inflated on a front-right side of the passenger, wherein a first opening is formed through the right-half airbag at an upper portion thereof;

wherein a recess is formed between the left-half airbag and the right-half airbag so as to face the passenger, when the airbag is inflated in front of the passenger, wherein the first opening of the left-half airbag and the first opening of the right-half airbag are communicated with each other, and wherein the first openings of the left-half airbag and the right-half airbag communicated with each other are formed to extend in a vehicle front-rear direction, wherein the first openings are formed in an elongated shape with a length in a longitudinal direction that is greater than a maximum width in a direction perpendicular to the longitudinal direction, and wherein a ratio of the length of the first openings in the longitudinal direction to a maximum width of the first openings in the direction perpendicular to the longitudinal direction is in a range of about 2 to about 10, when the airbag is not inflated.

2. The airbag according to claim 1, wherein a shortest distance (d1) between a top surface of the airbag and a first seam is in a range of 5 mm to 80 mm, when the airbag is inflated, wherein the first seam joins the left half-airbag and the right half airbag and is formed to surround the first openings.

3. The airbag according to claim 1, wherein the first openings extend in the vehicle front-rear direction such that a vertical position of the first opening in a direction perpendicular to the vehicle front-rear direction is gradually increased toward a rear side of the vehicle.

4. The airbag according to claim 1, wherein a length of the first openings in a longitudinal direction is in a range of 100 mm to 380 mm, and a length of the first openings in a direction perpendicular to the longitudinal direction is in a range of 10 mm to 180 mm, when the airbag is not inflated.

5. The airbag according to claim 1, wherein a second opening is formed through the left-half airbag at a lower portion thereof, and a second opening is formed through the right-half airbag at a lower portion thereof, and wherein the second openings are communicated with each other.

6. An airbag apparatus comprising:
the airbag according to claim 1;
a retainer which houses the airbag which is folded up therein; and
an inflator configured to inflate the airbag.

7. A vehicle comprising an airbag apparatus, the airbag apparatus comprising:
an airbag which is inflated rearward from an instrument panel of the vehicle to come close a passenger seated in a passenger seat, the airbag comprising:
a base chamber which is disposed at a front side of the vehicle;
a left-half airbag which is continuous with the base chamber and is inflated on a front-left side of the passenger, wherein a first opening is formed through the left-half airbag at an upper portion thereof; and
a right-half airbag which is continuous with the base chamber and is inflated on a front-right side of the passenger, wherein a first opening is formed through the right-half airbag at an upper portion thereof;
wherein a recess is formed between the left-half airbag and the right-half airbag so as to face the passenger, when the airbag is inflated in front of the passenger,
wherein the first opening of the left-half airbag and the first opening of the right-half airbag are communicated with each other, and
wherein the first openings of the left-half airbag and the right-half airbag communicated with each other are formed to extend in a vehicle front-rear direction,
wherein the first openings are formed in an elongated shape with a length in a longitudinal direction that is greater than a maximum width in a direction perpendicular to the longitudinal direction,
wherein a ratio of the length of the first openings in the longitudinal direction to a maximum width of the first openings in the direction perpendicular to the longitudinal direction is in a range of about 2 to about 10, when the airbag is not inflated,
a retainer which houses the airbag which is folded up therein; and
an inflator configured to inflate the airbag.

* * * * *